United States Patent
Kang

(10) Patent No.: US 9,910,308 B2
(45) Date of Patent: Mar. 6, 2018

(54) DISPLAY DEVICE

(71) Applicant: LG ELECTRONICS INC., Seoul (KR)

(72) Inventor: Seunggyu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/483,994

(22) Filed: Apr. 10, 2017

(65) Prior Publication Data

US 2018/0024396 A1    Jan. 25, 2018

Related U.S. Application Data

(60) Provisional application No. 62/366,100, filed on Jul. 24, 2016.

(30) Foreign Application Priority Data

Oct. 13, 2016  (KR) .................. 10-2016-0133051

(51) Int. Cl.
   *G06F 1/16* (2006.01)
   *G02F 1/1333* (2006.01)

(52) U.S. Cl.
   CPC .. *G02F 1/133308* (2013.01); *G02F 1/133382* (2013.01); *G02F 2001/133314* (2013.01)

(58) Field of Classification Search
   CPC .................................................. G02F 1/133308
   USPC .................................. 361/679.24; 349/58–60
   See application file for complete search history.

(56) References Cited

U.S. PATENT DOCUMENTS

| | | | | |
|---|---|---|---|---|
| 6,559,907 | B1 * | 5/2003 | Byoun .............. | G02F 1/133308 349/58 |
| 6,894,757 | B2 * | 5/2005 | Ha ..................... | G02F 1/133308 349/110 |
| 7,369,191 | B2 * | 5/2008 | Okamoto ............ | G02F 1/13452 349/58 |
| 7,808,571 | B2 * | 10/2010 | Lee ................... | G02F 1/133608 349/58 |
| 2002/0080297 | A1 * | 6/2002 | Sung ................. | G02F 1/133308 349/58 |
| 2008/0123016 | A1 * | 5/2008 | Kwak ............... | G02F 1/133308 349/59 |

(Continued)

FOREIGN PATENT DOCUMENTS

JP    3653847    6/2005

OTHER PUBLICATIONS

PCT International Application No. PCT/KR2017/006839, International Search Report dated Oct. 16, 2017, 3 pages.

*Primary Examiner* — Nidhi Thaker
(74) *Attorney, Agent, or Firm* — Lee, Hong, Degerman, Kang & Waimey PC

(57) ABSTRACT

A display device is disclosed. The display device may comprise a display panel; a module cover positioned at a rear of the display panel; a plate fastened to a rear of the module cover; and a back cover coupled with the plate, wherein the plate includes: a body facing the rear of the module cover; and a protrusion projecting from the body, the protrusion which is space apart from the module cover, wherein the back cover includes: a side wall formed on a side of the back cover; and a latch projecting from an inner side of the side wall, the latch which is inserted into between the protrusion and the module cover.

8 Claims, 13 Drawing Sheets

(56) References Cited

U.S. PATENT DOCUMENTS

| | | |
|---|---|---|
| 2011/0149198 A1 | 6/2011 | Kim et al. |
| 2013/0255117 A1* | 10/2013 | Lai .................... G02F 1/133308 |
| | | 40/564 |
| 2013/0335670 A1* | 12/2013 | Huang .................... H05K 5/03 |
| | | 349/58 |
| 2014/0233259 A1 | 8/2014 | Jung et al. |
| 2015/0304599 A1 | 10/2015 | Yamamoto |
| 2016/0120041 A1 | 4/2016 | Lee et al. |

* cited by examiner

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2016-0133051 filed on Oct. 13, 2016 which claims the benefit of U.S. Provisional Application No. 62/366,100, filed on Jul. 24, 2016, the contents of which are hereby incorporated by reference herein in their entirety.

BACKGROUND OF THE INVENTION

Field of the Invention

The present disclosure relates to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

As an example of an electroluminescence device, an active matrix typed organic light emitting display device is commercially available. Since organic light emitting display devices are self-luminous devices, they have no backlight as compared with liquid crystal display devices, and have advantages in response speed, viewing angle, and the like, and are attracting attention as a next generation display.

The manufacturing process of the display device includes a step of assembling the outer cover to the display module (or the display panel). A module cover for supporting the display panel can be coupled to the rear surface of the display panel, and the back cover can be fastened to the rear surface of the module cover.

There is a problem in that when the back cover is fastened to the module cover, the work process becomes long due to a large number of fastening parts including screws. Further, when the back cover is fastened to or detached from the module cover, the fastening parts are likely to be broken, and the broken parts are left as foreign matters in the module cover.

SUMMARY OF THE INVENTION

Accordingly, an object of the present disclosure is to address the above-described and other problems.

Another aspect of the present disclosure is to provide a display device simplifying the process of assembling the back cover to the module cover.

Another aspect of the present disclosure is to provide a display device preventing damage to fasteners when assembling or removing the back cover on the module cover.

Another aspect of the present disclosure is to provide a display device having the rigidity required for the display device.

Another aspect of the present disclosure is to provide a display device improving the heat dissipation of the display device.

In one aspect, there is provided a display device comprising: a display panel; a module cover positioned at a rear of the display panel; a plate fastened to a rear of the module cover; and a back cover coupled with the plate, wherein the plate includes: a body facing the rear of the module cover; and a protrusion projecting from the body, the protrusion which is space apart from the module cover, wherein the back cover includes: a side wall formed on an side of the back cover; and a latch projecting from an inner side of the side wall, the latch which is inserted into between the protrusion and the module cover.

In another aspect, the body of the plate may include a frame which is space apart from the rear of the module cover, and a mounting surface connected to the frame and contact with the rear of the module cover.

In another aspect, the plate may include: a plurality of protrusions projecting from the frame toward a rear of the plate, positioned along to an upper edge of the frame; and a plurality of first receiving portions formed between the plurality of protrusions and the module cover, and the back cover may include: a first side wall formed along to an upper side of the back cover; and a plurality of first latches formed along to the first side wall, positioned corresponding to the plurality of the first receiving portions, and inserted into the plurality of the first receiving portions.

In another aspect, the plate may include a plurality of second receiving portions positioned along to at least one of a left side and a right side of the frame, the plurality of second receiving portions formed through the frame, and the back cover may include: a second side wall formed along to at least one of a left side and a right side of the back cover; and a plurality of second latches formed along to the second side wall, positioned corresponding to the plurality of second receiving portions, and inserted into the plurality of the second receiving portions.

In another aspect, each of the plurality of second receiving portions may include: a receiving hole formed through the frame; and a guide hole formed through the frame, the guide hole positioned near the receiving hole, and each of the plurality of second latches may include: a fixing latch inserted into the receiving hole, the fixing latch having a shape of a hook; and a guide latch inserted into the guide hole, the guide latch having a shape of a column.

In another aspect, the guide latch may be close contact with a circumference of the guide hole, and the fixing latch is hooked in at least a portion of the receiving hole.

In another aspect, the first side wall may include a heat dissipation opening.

In another aspect, the first side wall may include a plurality of first structure arranged in a first direction at an interval; and a plurality of second structure arranged in a second direction at an interval, crossed with the plurality of first structure.

In another aspect, the heat dissipation opening may be formed by: two adjacent first structures among the plurality of first structures, and two adjacent second structures among the plurality of second structures.

In another aspect, the display device may further comprise a stand fixed to the module cover, wherein the stand is inserted into between the frame and the module cover.

An effect of the display device according to the present disclosure is described below.

According to at least one of the embodiments of this invention, the process of assembling the back cover to the module cover can be simplified by fastening the back cover to the module cover via the PCB plate without a screw.

According to at least one of the embodiments of this invention, it is possible to prevent damage to the fasteners when assembling or removing the module cover and the back cover, by fastening the back cover to the module cover via the PCB plate without a screw.

According to at least one of the embodiments of this invention, the back cover can be fastened to the module cover via PCB plate without a screw.

According to at least one of the embodiments of this invention, the rigidity of the back cover can be improved via a supporting column provided between the back cover and the PCB plate.

According to at least one of the embodiments of this invention, the dissipation of heat in the display device can be improved by using a heat dissipation matrix and/or an air gap between the PCB plate and the module cover.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
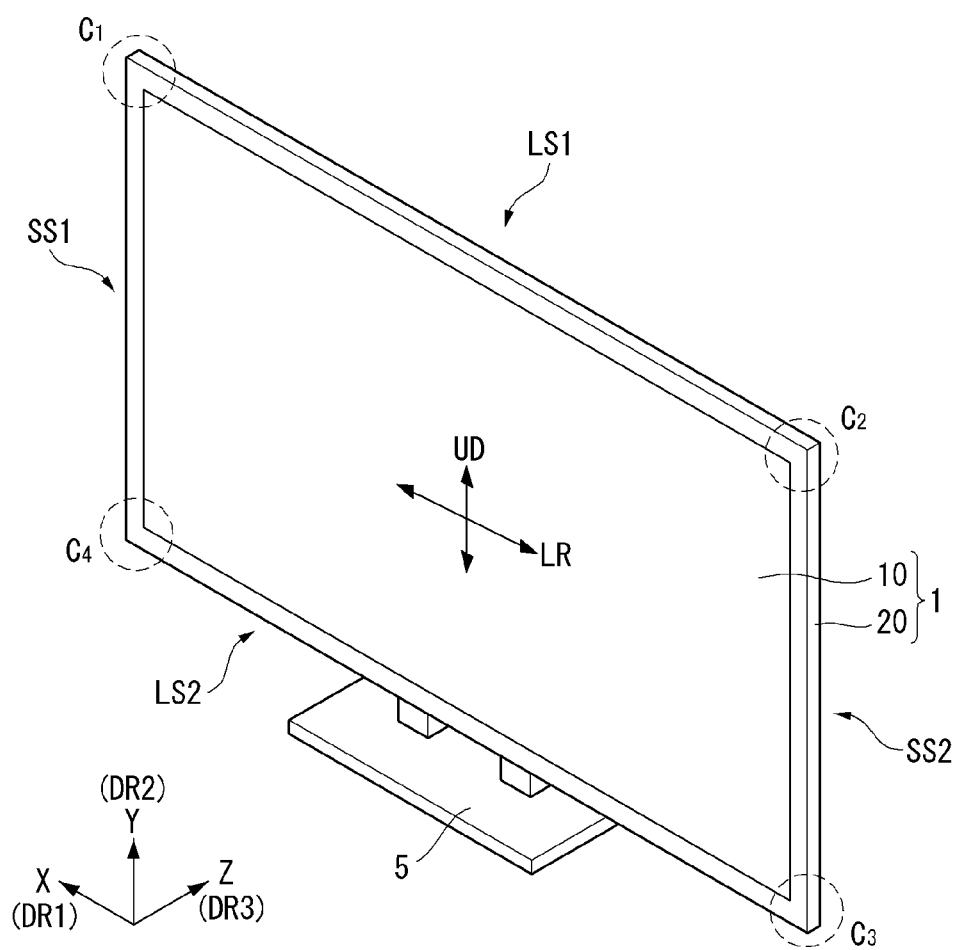
FIG. 1 and FIG. 2 are views showing examples of a display device according to an embodiment of the present invention.
Figure 2:
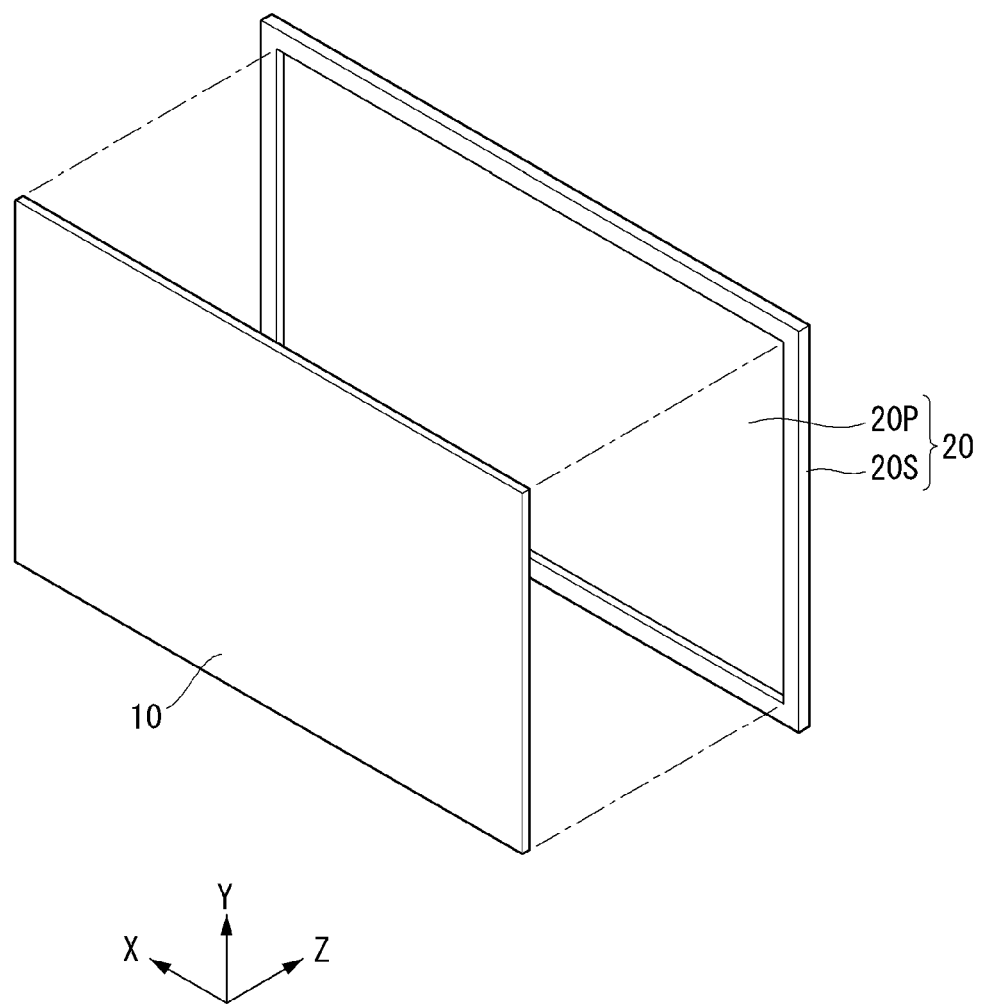
Figure 3:
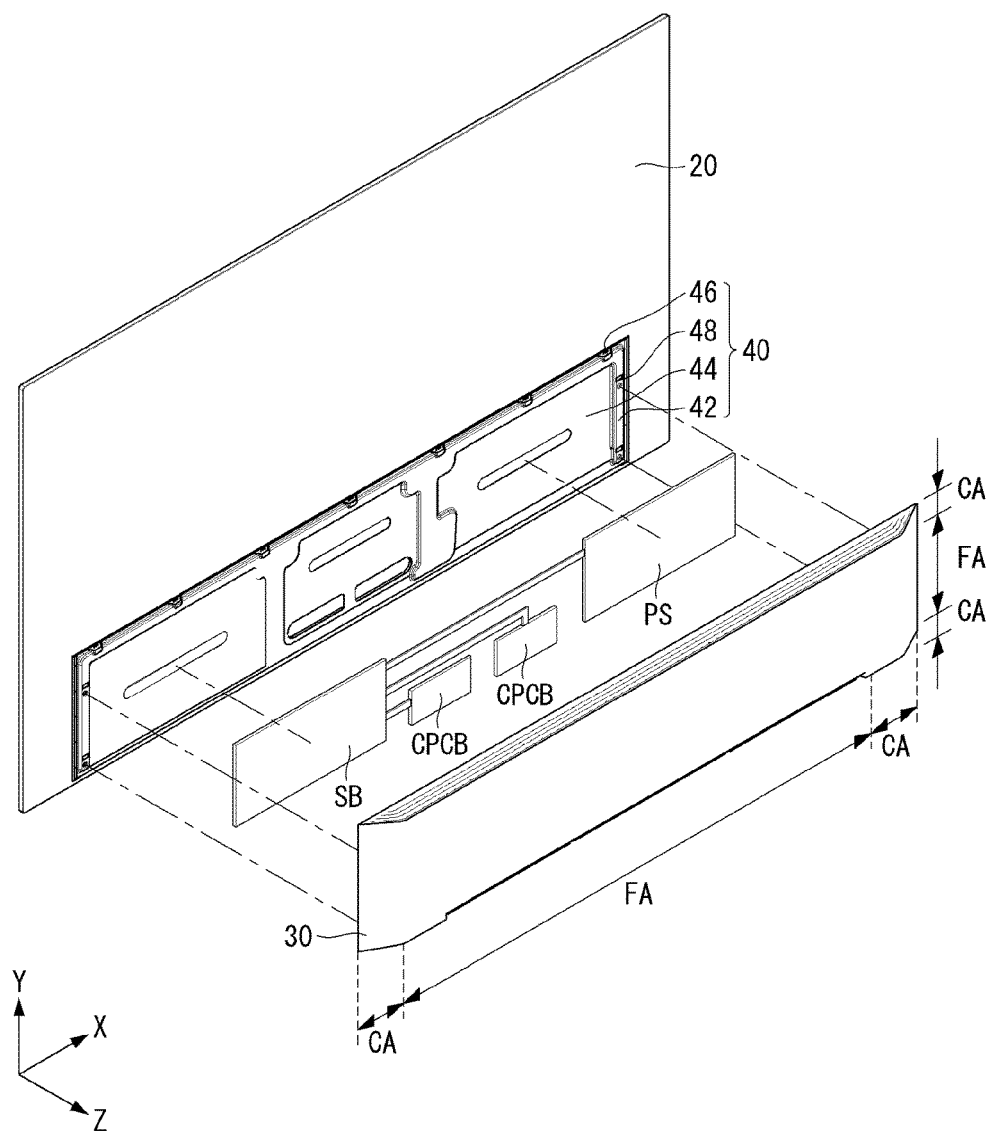
FIG. 3 and FIG. 4 are views showing examples of combination of back cover in a display device according to an embodiment of the present invention.
Figure 4:
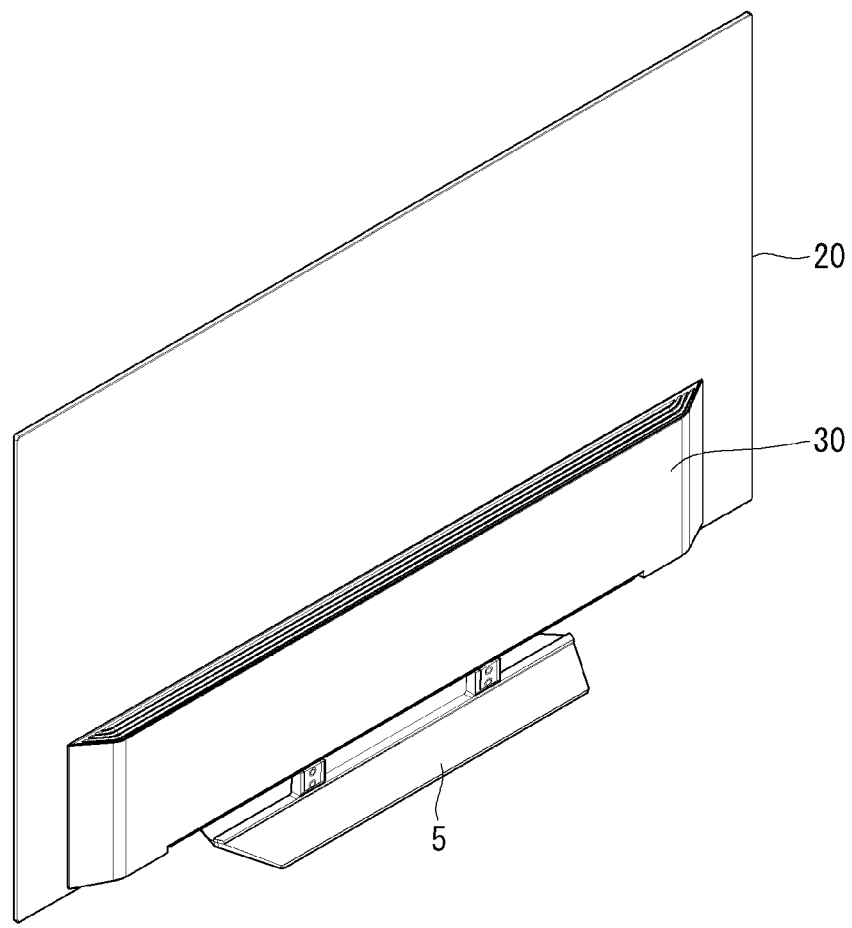

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100.

Further, a third direction DR3 may be a direction vertical to the first direction DR1 and/or the second direction DR2.

In the embodiment disclosed herein, the first direction DR1 and the second direction DR2 may be commonly referred to as a horizontal direction. Further, the third direction DR3 may be referred to as a vertical direction.

In another point of view, a side or a surface, on which the display device 100 displays an image, may be referred to as a front side or a front surface. When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Referring FIGS. 1 to 4, a display device 1 may be supported by a stand 5 and may include a display panel 10 for displaying an input image, a module cover 20 for covering the rear of the display panel 10, A PCB plate 40 on which set components necessary for driving the display panel 10 are mounted, and a back cover 30 surrounding the PCB plate 40.

The display panel 10 may be, for example, an OLED panel.

The module cover 20 may be formed as a rectangular frame, and may include a flat plate portion 20P and an edge portion 20S. The flat plate portion 20P of the module cover 20 can cover the rear of the display panel 10. The edge portion 20S of the module cover 20 may cover the side surface of the display panel 10. The area of the flat plate portion 20P may correspond to the area of the display panel 10. The edge portions 20S may be located along the four sides of the module cover 20 to cover the edge of the display panel 10.

The module cover 20 may be made of a high strength steel plate such as electro galvanized steel plate (EGI), stainless steel (SUS), galvalume (SGLC), aluminum plated steel plate (aka ALCOSTA), tinned steel plate.

The module cover 20 is made of a high-performance composite material (ACM), which is a combination of carbon fiber, silicon carbide fiber, aramid fiber, boron fiber, and heat resistant resin such as epoxy resin or polyimide It can also be made. When the module cover 20 is made of a high performance composite material (ACM), a conductive tape may be further attached to the inner surface of the module cover 20 contacting the display panel 10. The conductive tape improves the coupling of the display panel 10 and reduces Electro Magnetic Interference (EMI), thereby reducing the noise incorporated in the input image.

The PCB plate 40 may be fastened to the rear surface of the module cover 20. The frame 42 of the PCB plate 40 may be fastened to the rear surface of the module cover 20 through a screw (not shown) or the like. The PCB plate 40 may be provided with a mounting surface 44 on which set components such as a main board SB, control board CPCB and a power supply PS are mounted.

The system board SB may include a tuner for receiving a broadcast signal, an external device interface connected to an external device, a user interface device for receiving user input, various sensors, and the like. The power supply unit PS converts commercial AC power into driving power for the system board SB and the driving circuit of the display panel 10. The system board SB supplies the DC input power from the power supply PS to the driving circuit of the display panel 10 and transmits the video signal and the timing signal synchronized with the video signal to the driving circuit of the display panel 10.

The system board SB may be available in various display applications such as a television system, a set top box, a navigation system, a DVD player, a Blu-ray player, a personal computer (PC), a home theater system, a phone system, and a vehicle control system.

The back cover 30 covers the PCB plate 40 and can be fastened to the PCB plate 40 in a screwless manner. A plurality of latches protruding toward the PCB plate 40 may be provided on an inner wall of the back cover 30 facing the PCB plate 40 for screwless fastening. These latches can be fixed in the latch receiving portions 46, 48 provided on the PCB plate 40.

The back cover 30 may include a substantially flat planar portion FA and a corner portion CA bent from the planar portion FA toward the PCB plate 40. When the back cover 30 is fastened to the PCB plate 40, there is almost no change in the thickness of the back cover 30 at the plane portion FA. As one move from the corner portion CA to the end of the back cover 30, the thickness of the back cover 30 gets smaller. By designing the thickness of the back cover 30 differently, the design aesthetic can be enhanced.

The PCB plate 40 may be provided with latch receiving portions 46 and 48 into which the latches are press-fitted and fixed. A method of fastening the module cover 20 and the back cover 30 via the PCB plate 40 will be described later with reference to FIGS. 6 to 11.

The stand 5 is capable of supporting the display device 1. The stand 5 may be fastened to the PCB plate 40 through a screw process or the like, but is not limited thereto.

Figure 5:
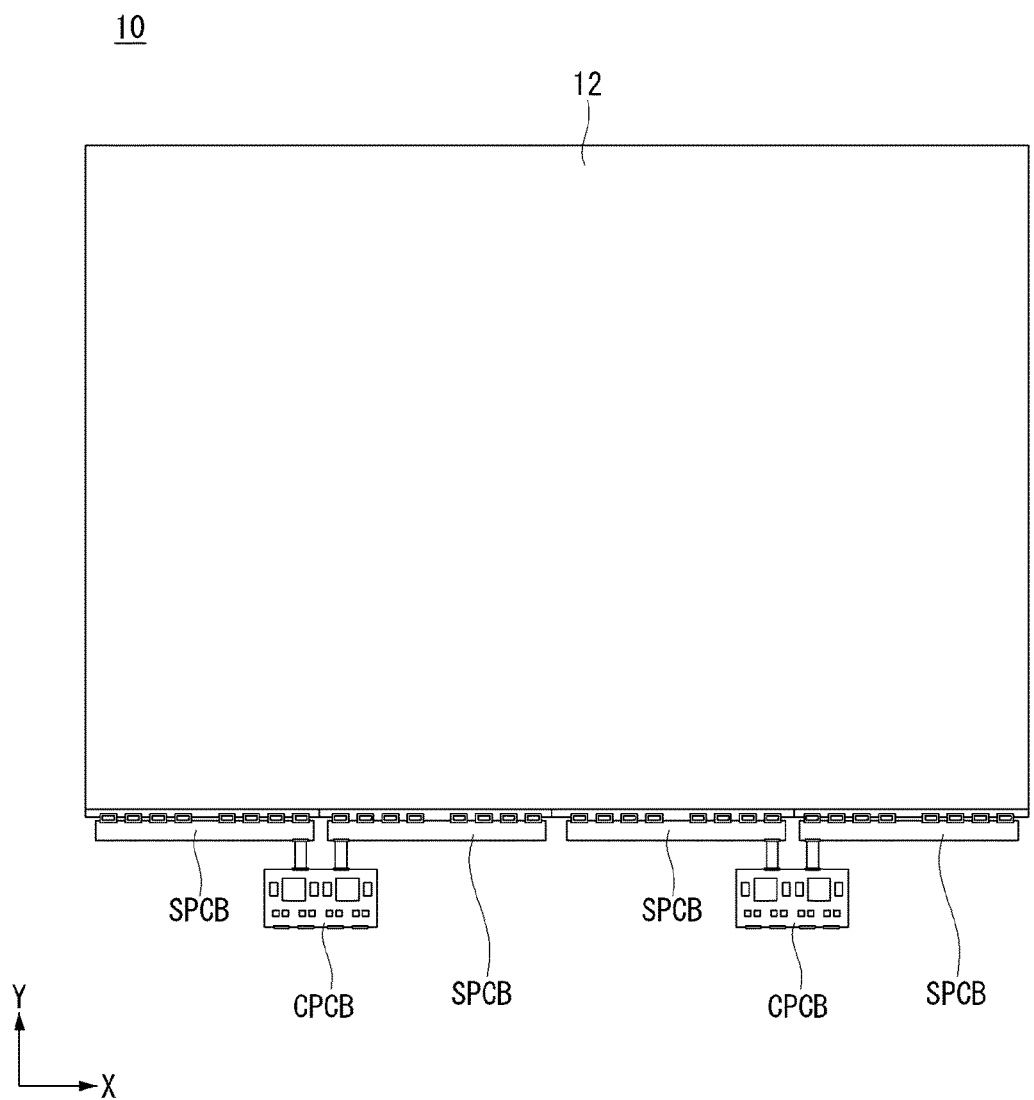
FIG. 5 is a view illustrating an example of a display panel that may be included in a display device according to an embodiment of the present invention.

Referring to FIG. 5, the display panel 10 may include a display unit 12, and a driving circuit for writing data of an input image to the display unit 12.

The driving circuit may include a data driving circuit for supplying a data voltage of an input image to the data lines of the display unit 12. The driving circuit may include a scan driving circuit (or gate driving circuit) for sequentially supplying a scan signal (or a gate pulse) synchronized with the data voltage to the scan lines of the display unit 12. The driving circuit may include a timing controller for controlling the operation timing of the data driving circuit and the scan driving circuit.

The screen of the display unit 12 may include a pixel array displaying an input image. In the pixel array, pixels may be arranged in a matrix form by the intersection structure of the data lines and the scan lines. The pixels may comprise red (R), green (G), and blue (B) sub-pixels for color implementation. Each of the pixels may further include a white (W) sub-pixel. Each of the sub-pixels may include a thin film transistor (TFT) that supplies a data voltage from the data line to the pixel electrode in response to the scan pulse. In the case of an OLED display device, each of the sub-pixels may include a 'switch TFT', a 'driving TFT', an 'OLED', and the like. The 'driving TFT' may be a driving element that adjusts the current flowing in the OLED according to the data of the input image.

The data driving circuit may be integrated in a 'source drive IC' (Integrated Circuit). The 'source drive IC' may be mounted in a 'COF' (Chip on film). The COF may be bonded to the data pads of the display unit 12 using an 'ACF' (Anisotropic Conductive Film). The data pads may be connected to the data lines. The data driving circuit may sample the digital data of the input image received from the timing controller. The data driving circuit may convert the sampled digital data into a gamma compensation voltage using a digital to analog converter to generate a data voltage. The data driving circuit may output the data voltage to the data lines.

The scan driving circuit may be formed directly on the substrate of the display unit 12 by a GIP (Gate In Panel) process and connected to the scan lines. 'IC's integrated with a scan driving circuit can be bonded to the gate pads of the display unit 12 using an ACF in a TAB (Tape Automated Bonding) process. The scan pads are connected to the scan lines. The scan driving circuit may provide scan pulse synchronized with the data voltage to the scan lines sequentially. The synchronization of the scan pluses can be implemented by using the shift register that sequentially outputs in synchronization with the clock timing based on the received start pulse and shift clock.

The timing controller may receive the digital data of the input image from the system board SB and may transmit it to a 'source drive IC' SIC. The timing controller may receive timing signals such as a vertical/horizontal synchronizing signal, a data enable signal, and a main clock signal, and may generate timing control signals for controlling the operation timings of the 'source drive IC' SIC and the scan driving circuit.

The timing controller can multiply the input frame frequency by N (N is a positive integer of 2 or more) to make a frame frequency. The timing controller may control a display panel driving circuit with reference of the frame frequency. The input frame frequency may be 50 Hz in the PAL (Phase Alternate Line) method and 60 Hz in the National Television Standards Committee (NTSC) method.

The timing controller, a level shifter, power management integrated circuit (PMIC), and the like may be mounted on the control board CPCB. The PMIC may generate a DC voltage supplied from the system board SB using DC-DC converter to generate a voltage necessary for driving the display unit 12. The control board CPCB may be connected to the source board SPCB via a flexible flat cable FFC and also connected to the system board SB.

The level shifter shifts the voltage level of the gate timing control signal to convert the gate timing control signal into a signal swinging between a gate high voltage (VGH) and a gate low voltage (VGL) send. The gate high voltage VGH is set to a voltage higher than the threshold voltage of the TFTs disposed in each of the subpixels. The gate-low voltage VGL is set to a voltage lower than the threshold voltage of the TFT. The TFT is turned off in response to the VGL voltage of the scan pulse while being turned off in response to the VGL voltage of the scan pulse.

In the case of a large-screen display device, a plurality of display panel driving circuits may be connected to the display unit 12 to divide and drive the screen of the display unit 12.

Such a driving circuit can be implemented through a driving circuit mounting process. The driving circuit mounting step mounts an integrated circuit (IC) of the data driving circuit on the substrate of the display panel 12 using a COG (Chip On Glass) process or a TAB (Tape Automated Bonding) process. The scan driving circuit may be formed directly on the substrate of the display unit by a GIP (Gate in Panel) process, or may be attached to the substrate by the TAB process in the driving circuit mounting process. Subsequently, the driving circuit mounting step connects the integrated circuit (IC) and the source board SPCB with a flexible cable such as an FPC (Flexible Printed Circuit board) or an FFC (Flexible Flat Cable).

The module cover 20 and the PCB plate 40 may be fastened to the display panel 10 after the driving circuit mounting process. The system board SB mounted on the PCB plate 40 and the set parts such as the power supply PS may be connected to the driving circuit. An assembling process of covering the PCB plate 40 with the back cover 30 may be performed.

According to an aspect of the present invention, a screwless fastening method as described below may be presented in order to simplify the assembling process of the back cover 30 and/or prevent breakage of the fastening part when the back cover 30 is assembled or disassembled.

Figure 6:
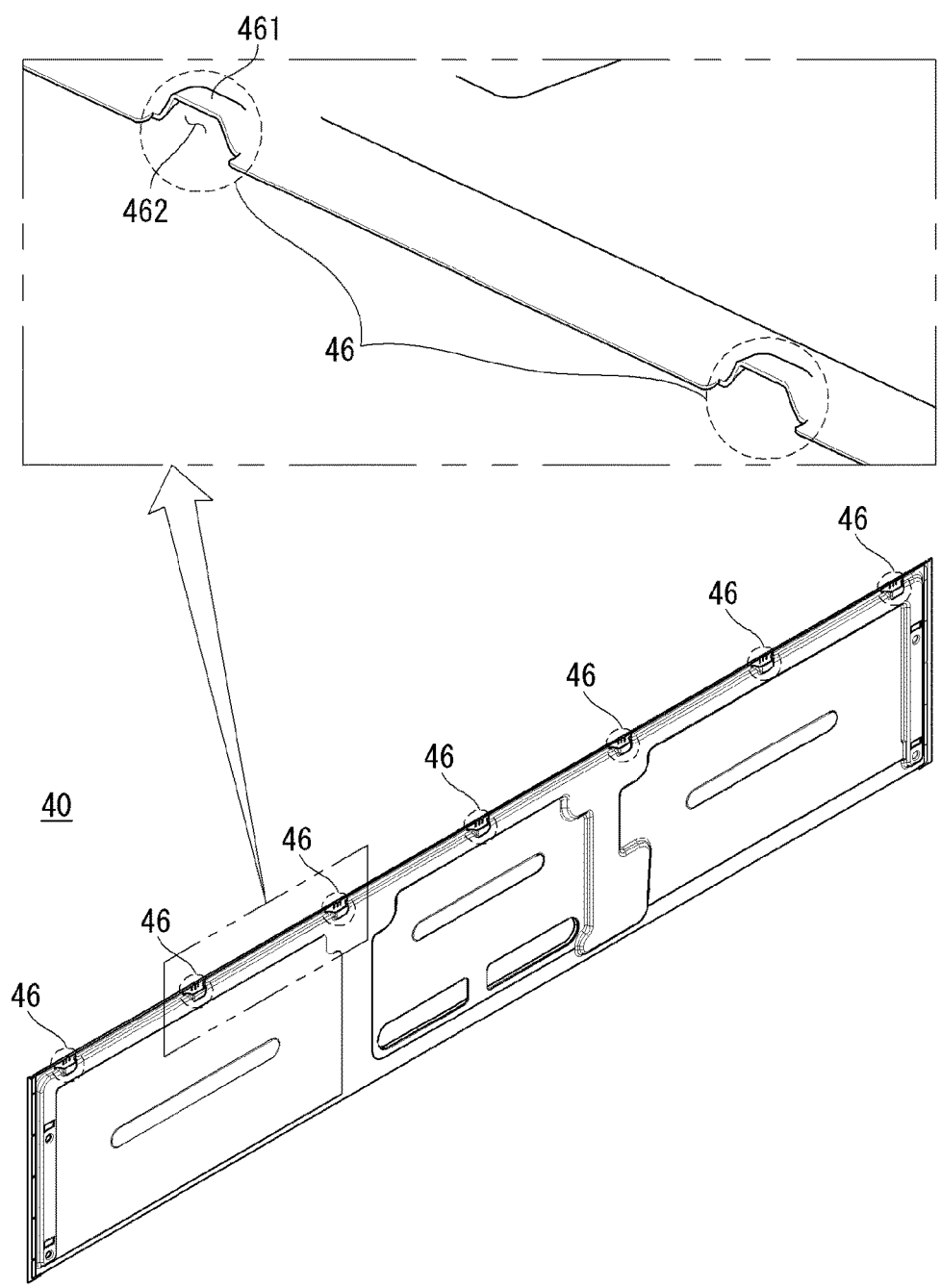
FIGS. 6 to 13 are views illustrating examples of fastening structure of a back cover in a display device according to an embodiment of the present invention.
Figure 7:
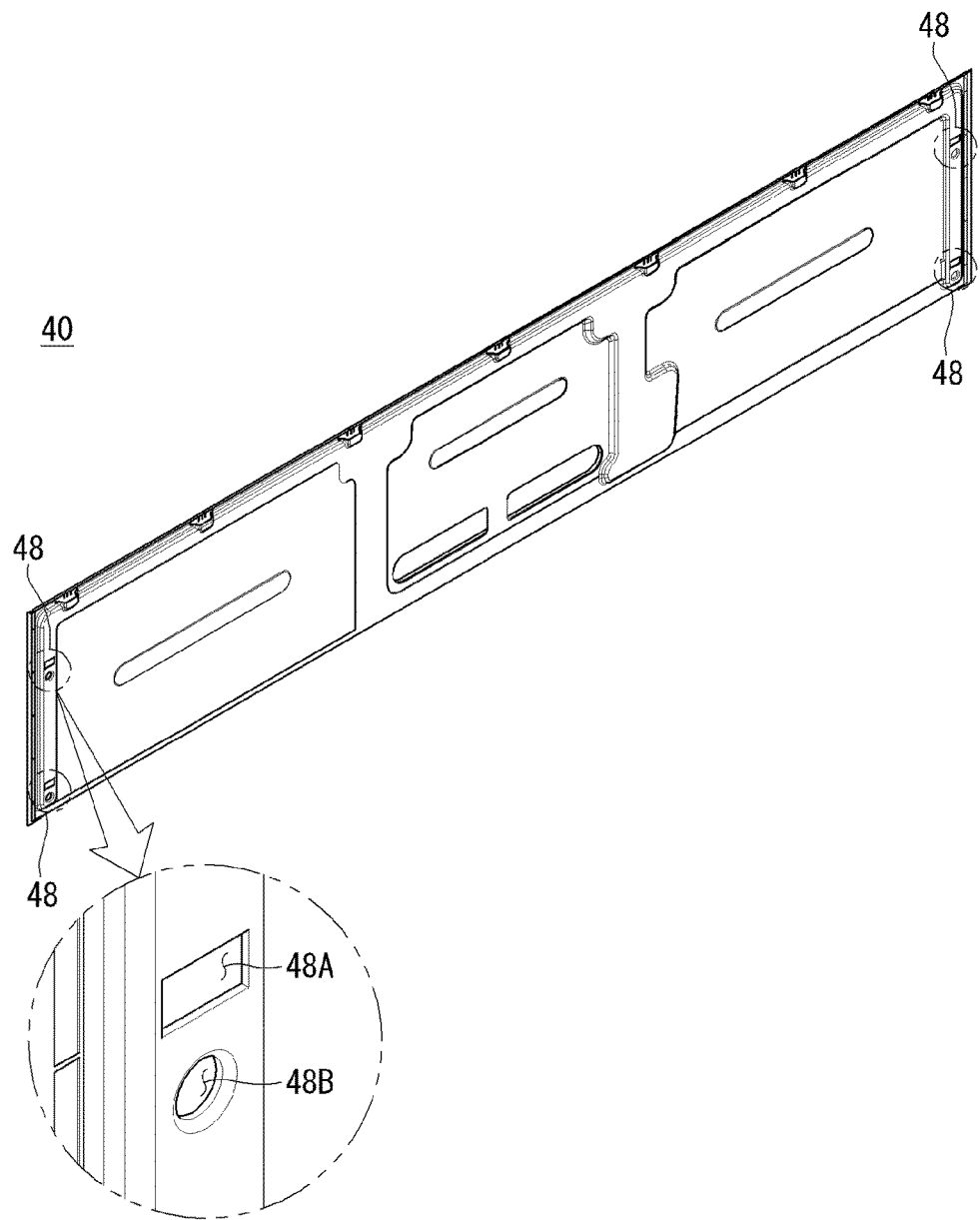
Figure 8:
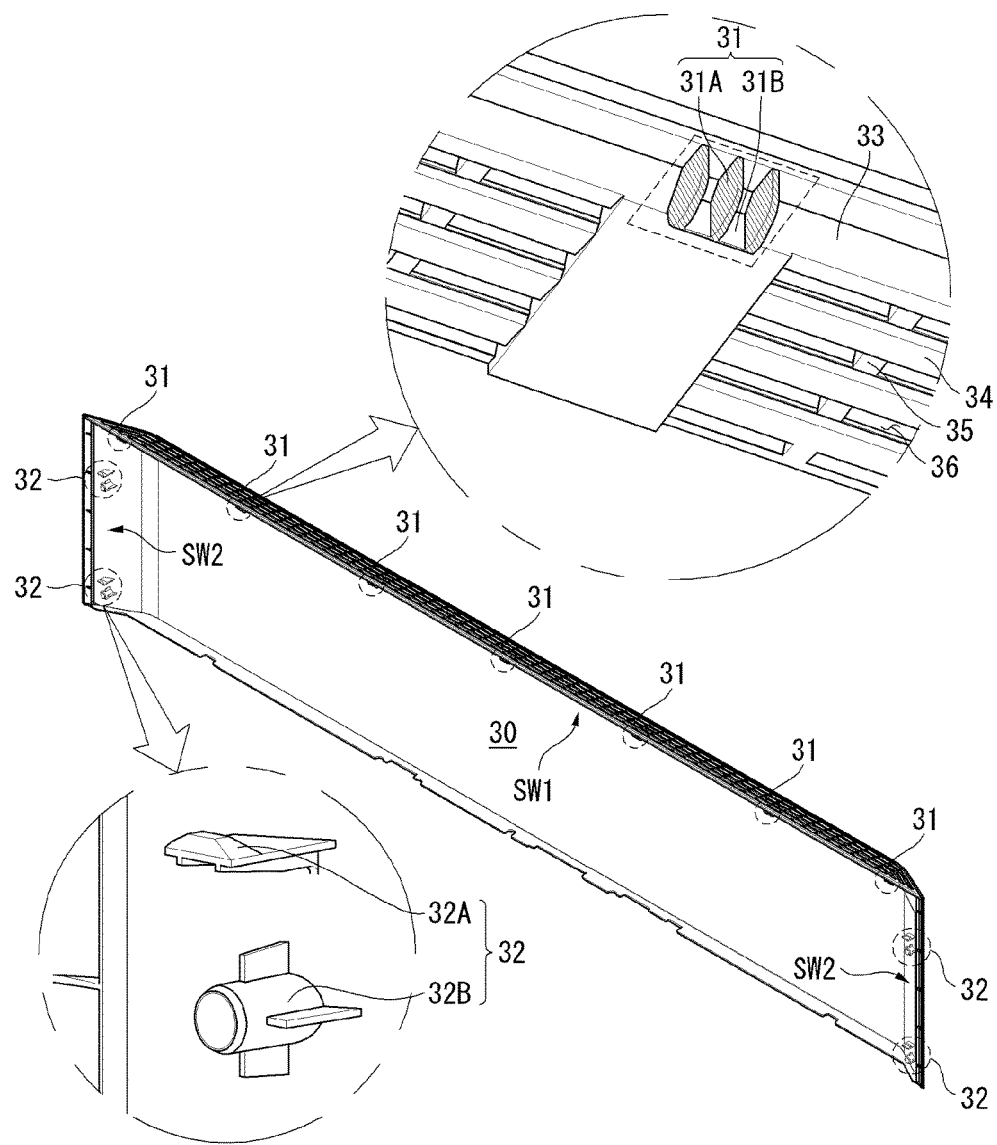

Referring to FIGS. 6 to 8, the first and second latches 31 and 32 of the back cover 30 may be inserted into the first and second latch receiving portions 46 and 48 of the PCB plate 40, The back cover 30 can be fastened to the PCB plate 40 on the back surface of the module cover 20.

The PCB plate 40 may include a plurality of first latch receiving portions 46 for receiving the first latches 31 of the back cover 30. Each of the first latch receiving portions 46 may have a protrusion 461 protruding from the body of the PCB plate 40. The latch receiving groove 462 may be formed by the protrusion 461. The protrusions 461 may be implemented in an arch shape to have high rigidity.

The back cover 30 may be provided with first latch 31. A plurality of first latches 31 may be provided on a inner side wall SW1 of the back cover 30. The inner side wall SW1 may face the PCB plate 40. The first latches 31 may be located in the inner side wall SW1. The inner side wall SW1 of the back cover 30 may be formed on the upper side of the back cover 30. The walls SW1 and SW2 may be referred to as a side wall. The first inner side wall SW1 can be referred to as a first side wall SW1. The second inner side wall SW2 can be referred to as a second side wall SW2.

Each of the first latches 31 may include a guide surface 31A for guiding the press-fitting of the first latch 31 and a restricting surface 31B for fixing the first latch 31 in the latch receiving groove 462. The guide surface 31A may have a curvature or an angle with respect to the restricting surface 31B, so that the first latch 31 of the back cover 30 can be easily press-fitted into the latch receiving groove 462 of the first latch receiving portion 46. The restricting surface 31B may allow the first latch 31 to be press-fitted and restrained in the inner wall of the protrusion 461 of the first latch receiving portion 46 in the latch receiving groove 462. The restricting surface 31B may be brought into close contact with the inner wall of the protrusion 461, and the restricting surface 31B and the guide surface 31A may form an acute angle, so that the first latch 31 is firmly fixed in the first latch receiving portion 46.

The guide surface 31A can be referred to as a guide portion 31A and the restricting surface 31B can be referred to as a restricting portion 31B.

The PCB plate 40 may further include a plurality of second latch receiving portions 48 for receiving the second latches 32 of the back cover 30. Each of the second latch receiving portions 48 may include a latch receiving hole 48A and a latch guide hole 48B. The latch receiving hole 48A may be referred to as a receiving hole 48A. The latch guide hole 48B may be referred to as a guide hole 48B.

The latch receiving hole 48A may have various shapes other than the illustrated square. The latch guide hole 48B may have various shapes other than the illustrated circular shape.

The back cover 30 may further include second latches 32. The second latches 32 may face the PCB plate 40 and may be positioned on other inner side wall SW2 bent from the inner side wall SW1. The other inner side wall SW2 may be formed on one side or both sides of the back cover 30. Both sides can be left and right.

Each of the second latches 32 may include a fixing latch 32A that is press-fitted into the latch receiving hole 48A of the second latch receiving portion 48 and fixed to the latch receiving hole 48A through a fixing protrusion. Each of the second latches 32 may include a guide latch 32B which is press-fitted into the latch guide hole 48B of the second latch receiving portion 48.

The head of the fixing latch 32A can be embodied as a fixing protrusion. The fixing protrusion may have a hook shape having an arrow-shaped cross section in one direction or in both directions. The fixing protrusion can be press-fitted and fixed in the latch receiving hole 48A. The guide latch 32B can be pressed into the latch guide hole 48B to guide the position of the latch receiving hole 48A into which the fixing latch 32A is to be press-fitted.

A plurality of heat dissipation openings 36 may be arranged in a lattice pattern on the inner side wall SW1 of the back cover 30 to form a heat dissipation matrix. The heat dissipation openings 36 may radiate heat generated from the PCB plate 40. The heat dissipation matrix may be formed with a cross structure of a first structure 34 arranged in a first direction at regular intervals and a second structure 35 arranged in a second direction so as to intersect the first direction at regular intervals is.

Figure 9:
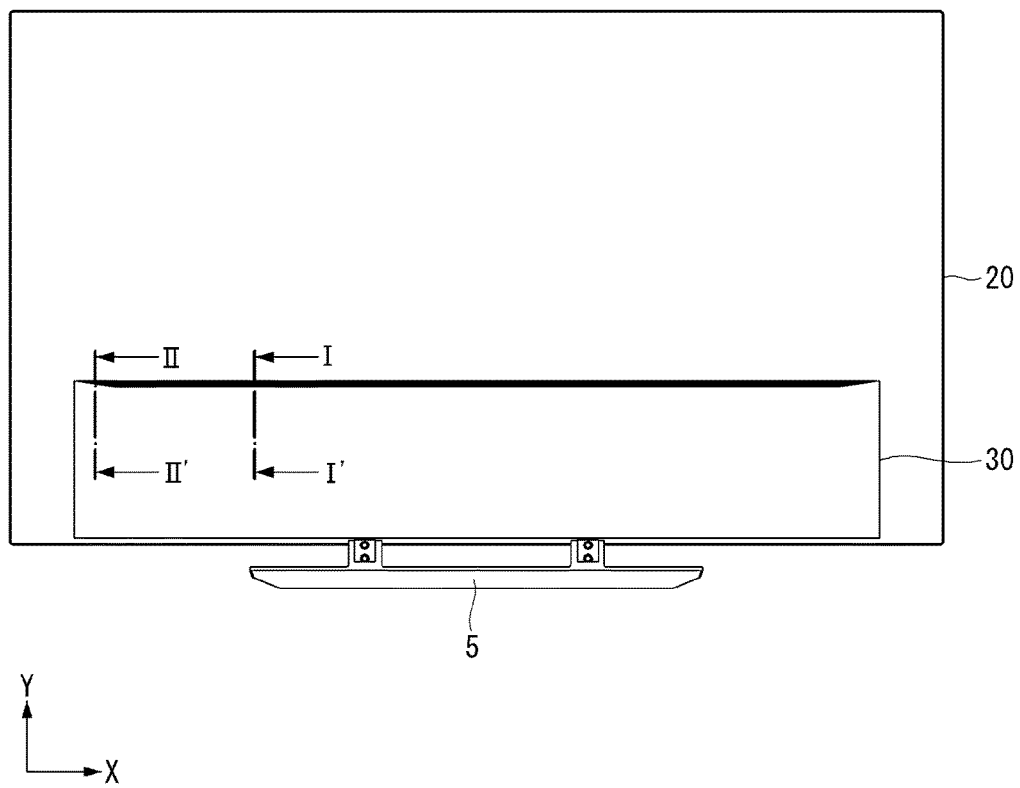
Figure 10:
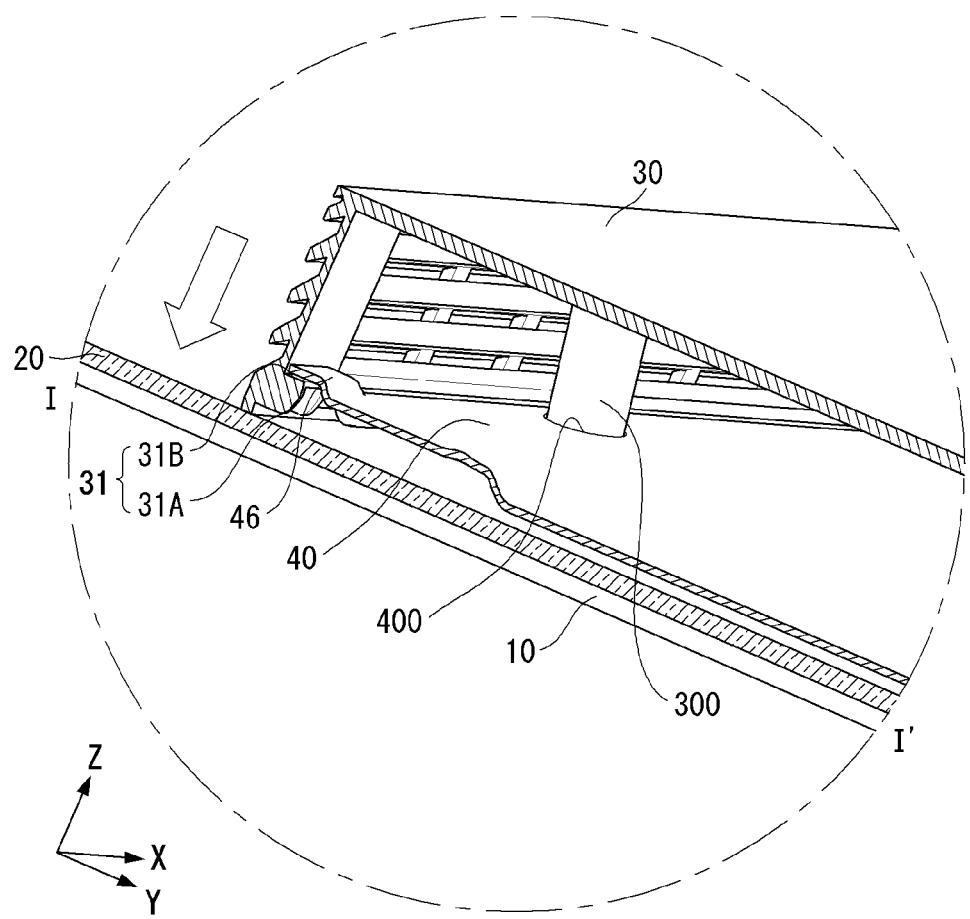

Referring to FIGS. 9 and 10, the first latch 31 of the back cover 30 and the first latch receiving portion 46 of the PCB plate 40 may be aligned. The first latch 31 may be pressed in the direction of an arrow (opposite to Z axis) so that the PCB plate 40 comes into contact with the protrusion 461 of the first latch receiving portion 46 while the guide surface 31A of the first latch 31 presses the module cover 20.

When the first latch 31 is subsequently pushed in the direction of the arrow Z in this state, the contact between the guide surface 31A and the protrusion 461 is released, and the restricting surface 31B of the first latch 31 may be brought into close contact with the inner wall of the protrusion 461 because of the elastic restoring force of the first latch 31. Accordingly, the first latch 31 of the back cover 30 can be press-fitted and fixed to the first latch receiving portion 46 of the PCB plate 40 without a screw.

Meanwhile, the first latch 31 and the first latch receiving portion 46 can be automatically aligned by fastening the second latch 32 and the second latch receiving portion 48. Therefore the fastening process might not need any aligning device for aligning the first latch 31 and the first latch receiving portion 46, so that the number of processes can be reduced and the fastening operation can be simplified.

An internal space may be provided between the PCB plate 40 and the back cover 30 by at least one supporting column 300 provided on the back cover 30. The supporting columns 300 can be in contact with the module cover 20 through the through-holes 400 formed on the PCB plate 40. The supporting columns 300 can reinforce the rigidity of the back cover 30. The inner space provided by the supporting columns 300 can provide a passage through which ambient air flows from the heat dissipation matrix of the back cover 30. The ambient air introduced into the internal space serves to release heat generated between the PCB plate 40 and the back cover 30.

Figure 11:
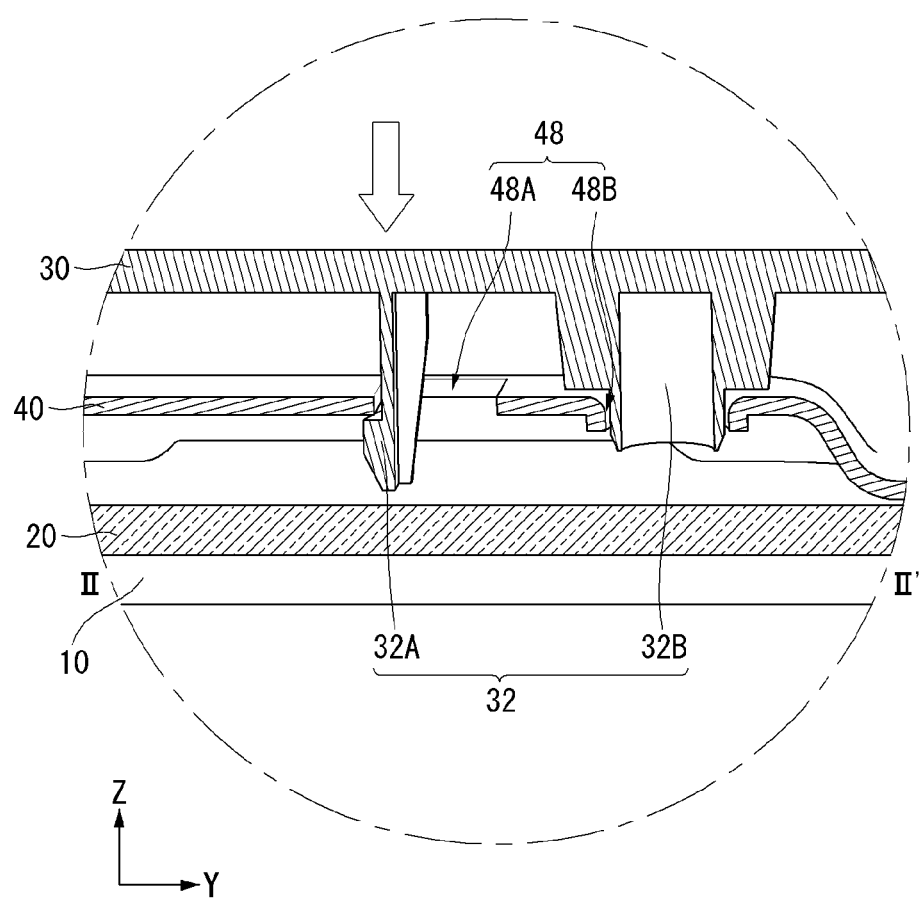

Referring FIGS. 9 and 11, the second latch 32 of the back cover 30 and the second latch receiving portion 48 of the PCB plate 40 may be aligned. When the second latch 32 is pressed in the direction of an arrow (opposite to Z axis), the fixing latch 32A of the second latch 32 may be press-fitted into the latch receiving hole 48A, and the guide latch 32B of the second latch 32 may be press-fitted into the latch guide hole 48B. When the guide latch 32B is pushed into the latch guide hole 48B, the fixing latch 32A may be fixed in the latch receiving hole 48A. The second latch 32 of the back cover 30 can be press-fitted and fixed to the second latch receiving portion 48 without a screw.

Figure 12:
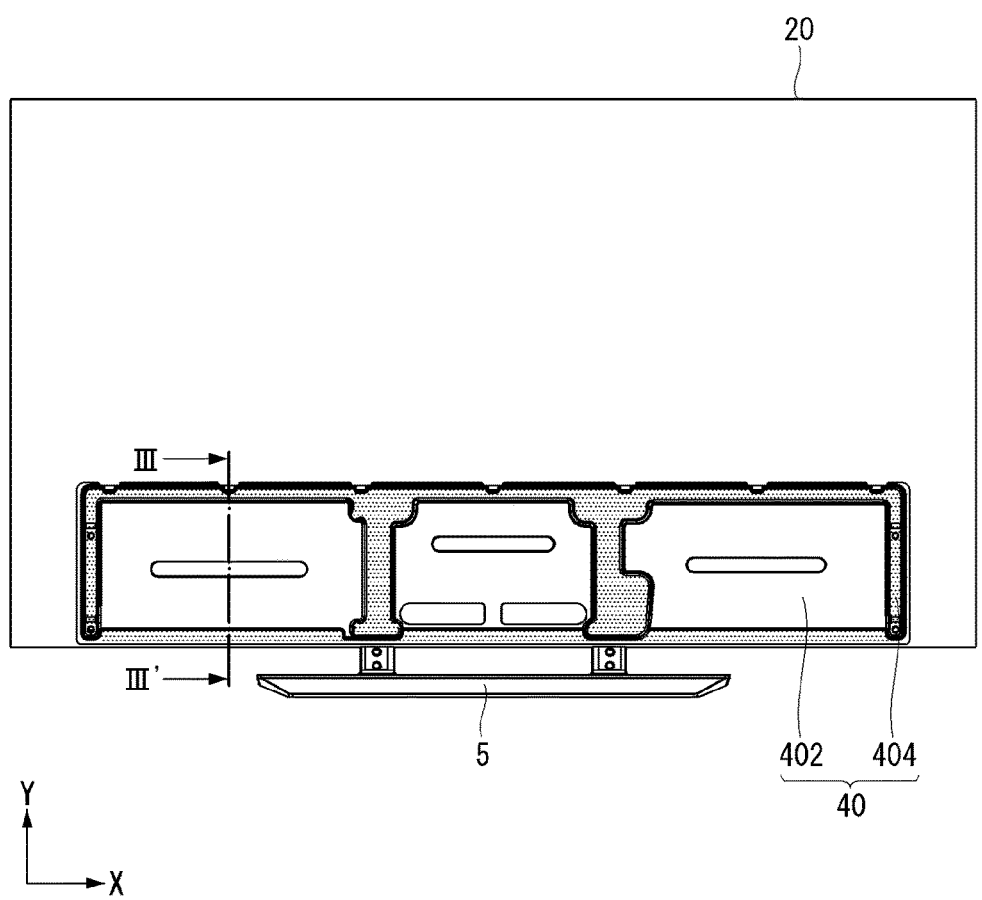
Figure 13:
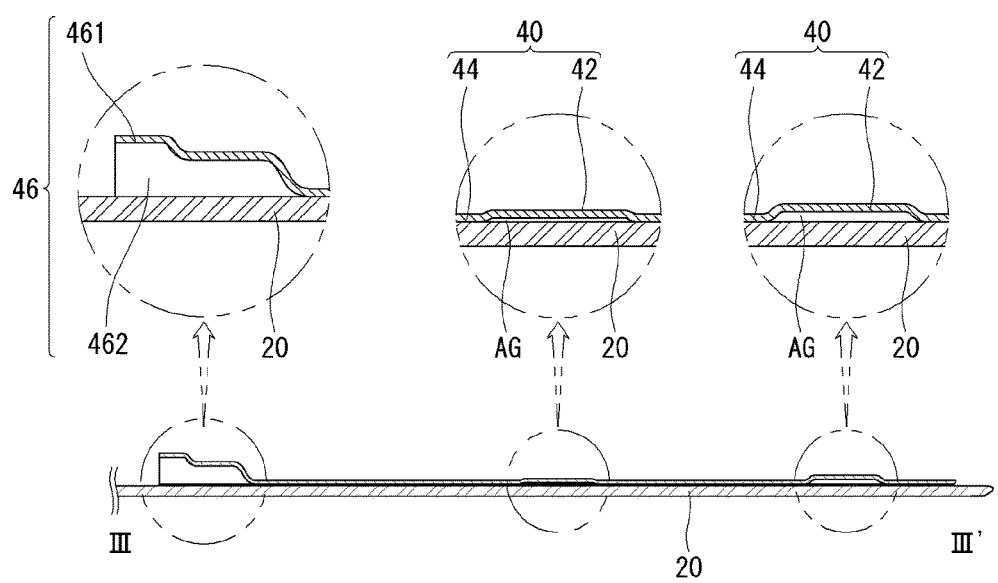

Referring to FIGS. 12 and 13, the PCB plate 40 may include a mounting surface 44 on which the set components are mounted, and a frame 42 which is fastened to the module cover 20.

The frame 42 may divide the mounting surface 44 and may be fastened to the module cover 20 through a screw process or the like. The mounting surface 44 can come into contact with the rear surface of the module cover 20.

The frame 42 may be spaced apart from the module cover 20. In other words, an air gap AG connected to the outside air (or ambient air) may be provided between the frame 42 and the module cover 20. The air gap AG can dissipate the heat transmitted from the PCB plate 40 as the outside air flows in and/or out. In addition, the gap AG may contribute to the prevention of heat transfer from the PCB plate 40 to the display panel 10. That is, the air gap AG can provide a heat dissipating and/or insulating function.

The stand 5 may be inserted between the module cover 20 and the PCB plate 40. The stand 5 can be inserted and fixed in a space formed between the frame 42 and the module cover 20. The stand 5 can be screwed with the module cover 20 and/or the PCB plate 40.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising: a display panel; a module cover positioned at a rear of the display panel; a plate fastened to a rear of the module cover; a stand coupled to the module cover; a back cover coupled with the plate, wherein the plate includes: a body facing the rear of the module cover, wherein the body includes a frame which is spaced apart from the rear of the module cover and a mounting surface connected to the frame and contacting the rear of the module cover; and a protrusion projecting from the body, wherein the protrusion is spaced apart from the module cover, wherein the back cover includes: a side wall formed on a side of the back cover; and a latch projecting from an inner side of the side wall, wherein the latch is inserted between the protrusion and the module cover, wherein the stand is inserted between the frame and the module cover.

2. The display device of claim 1, wherein the plate includes: a plurality of protrusions projecting from the frame toward a rear of the plate, positioned along an upper edge of the frame; and a plurality of first receiving portions formed between the plurality of protrusions and the module cover, and wherein the back cover includes: a first side wall formed along an upper side of the back cover; and a plurality of first latches formed along the first side wall, positioned corresponding to the plurality of the first receiving portions, and inserted into the plurality of the first receiving portions.

3. The display device of claim 2, wherein the first side wall includes a heat dissipation opening.

4. The display device of claim 3, wherein the first side wall includes: a plurality of first structures arranged in intervals in a first direction; and a plurality of second structures arranged in intervals in a second direction crossing with the plurality of first structures.

5. The display device of claim 4, wherein the heat dissipation opening is formed by:
two adjacent first structures among the plurality of first structures, and
two adjacent second structures among the plurality of second structures.

6. The display device of claim 1, wherein the plate includes a plurality of second receiving portions positioned along at least one of a left side or a right side of the frame, wherein the plurality of second receiving portions are formed through the frame, wherein the back cover includes; a second side wall formed along to at least one of a left side or a right side of the back cover; and a plurality of second latches formed along the second side wall, positioned corresponding to the plurality of second receiving portions, and inserted into the plurality of the second receiving portions.

7. The display device of claim 6, wherein each of the plurality of second receiving portions includes:
a receiving hole formed through the frame; and
a guide hole formed through the frame, the guide hole positioned near the receiving hole, and
wherein each of the plurality of second latches includes:
a fixing latch inserted into the receiving hole, the fixing latch having a shape of a hook; and
a guide latch inserted into the guide hole, the guide latch having a shape of a column.

8. The display device of claim 7, wherein the guide latch is in close contact with a circumference of the guide hole, and the fixing latch is hooked in at least a portion of the receiving hole.

* * * * *